US012644738B2

(12) United States Patent
Voigt et al.

(10) Patent No.: US 12,644,738 B2
(45) Date of Patent: Jun. 2, 2026

(54) AUTOMATION FIELD DEVICE

(71) Applicant: Endress+Hauser Flowtec AG, Reinach (CH)

(72) Inventors: Frank Voigt, Weil am Rhein (DE); Steffen Ziegler, Schopfheim (DE)

(73) Assignee: Endress+Hauser Flowtec AG, Reinach (CH)

( * ) Notice: Subject to any disclaimer, the term of this patent is extended or adjusted under 35 U.S.C. 154(b) by 300 days.

(21) Appl. No.: 18/579,177

(22) PCT Filed: Jul. 4, 2022

(86) PCT No.: PCT/EP2022/068397
§ 371 (c)(1),
(2) Date: Jan. 12, 2024

(87) PCT Pub. No.: WO2023/285181
PCT Pub. Date: Jan. 19, 2023

(65) Prior Publication Data
US 2024/0344861 A1      Oct. 17, 2024

(30) Foreign Application Priority Data

Jul. 14, 2021      (DE) ..................... 10 2021 118 128.3

(51) Int. Cl.
*G01F 1/60*      (2006.01)
*G01F 1/58*      (2006.01)

(52) U.S. Cl.
CPC ................ *G01F 1/60* (2013.01); *G01F 1/586* (2013.01)

(58) Field of Classification Search
CPC . G01F 1/60; G01F 1/586; G01F 15/14; G01F 1/58
See application file for complete search history.

(56) References Cited

U.S. PATENT DOCUMENTS

| 5,869,766 A | 2/1999 | Cucci et al. |
| 2010/0212433 A1 | 8/2010 | Hunziker |

FOREIGN PATENT DOCUMENTS

| DE | 102007058608 A1 | 6/2009 |
| DE | 102015207876 A1 | 11/2016 |

(Continued)

OTHER PUBLICATIONS

English Machine Translation of Lang, DE 102015207876 A1 (Year: 2015).*

(Continued)

*Primary Examiner* — David Z Huang
(74) *Attorney, Agent, or Firm* — Christopher R. Powers; Endress+Hauser (USA) Holding, Inc.

(57) ABSTRACT

An automation field device: a measuring tube for carrying a free-flowing medium or a container for storing the medium; a measuring arrangement for determining a physical and/or chemical measured variable of the medium at least partially arranged on the measuring tube or on the container; a housing for accommodating an electronic component for operating the measuring arrangement, controlling a controlled variable of the measuring arrangement, determining a measured value of the measured variable and/or evaluating the measured variable of the measuring arrangement, wherein the housing is arranged on the measuring tube or on the container; and at least one molding arranged in the housing, wherein the at least one molding has an at least partially elastically formed first section, which has a receptacle with an undercut, wherein the electronic component is arranged with interlocking or force-fit engagement in the undercut and is held by the first section.

20 Claims, 5 Drawing Sheets

(56)            References Cited

FOREIGN PATENT DOCUMENTS

| DE | 102015122435 | A1 |   | 6/2017 |  |
|----|--------------|-----|---|--------|--|
| DE | 102018129353 | A1 |   | 5/2020 |  |
| DE | 102019118074 | A1 |   | 1/2021 |  |
| DE | 102019125687 | A1 |   | 3/2021 |  |
| EP |      2597435 | B1 | * | 10/2019 | ............ G01F 15/14 |

OTHER PUBLICATIONS

English Machine Translation of Bulteau et al, EP 2597435 B1 (Year: 2011).*
IPC-2222B, Sectional Design Standard for Rigid Organic Printed Board, IPC International Inc., Oct. 2020, pp. 1-4.

\* cited by examiner

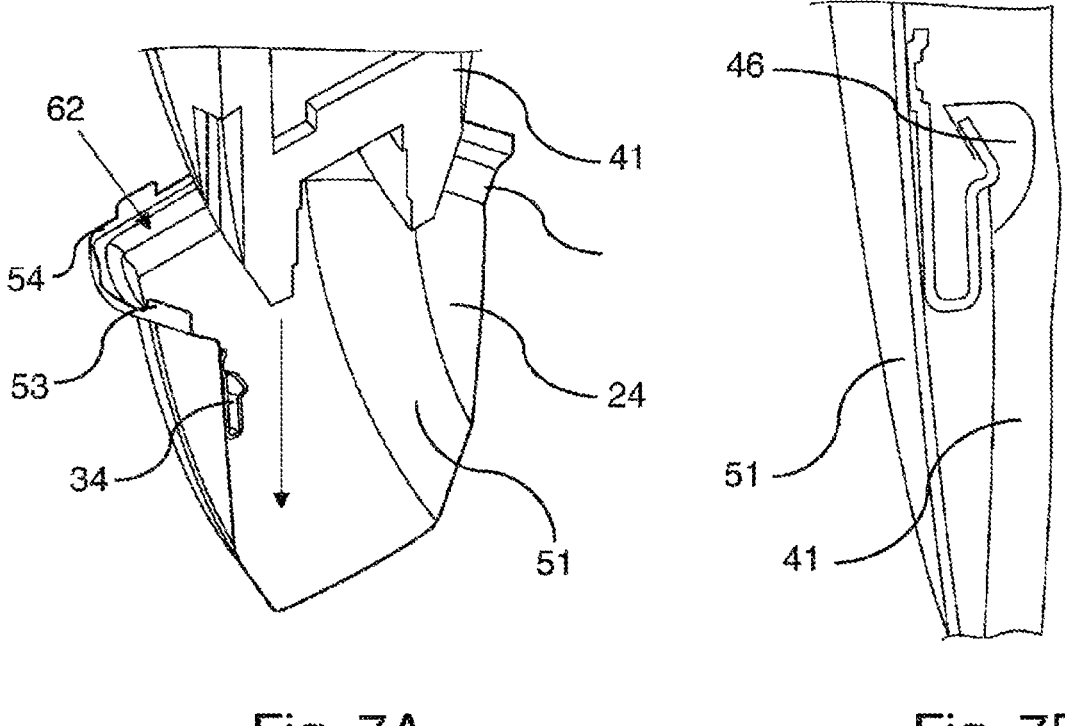
Fig. 7A                                Fig. 7B
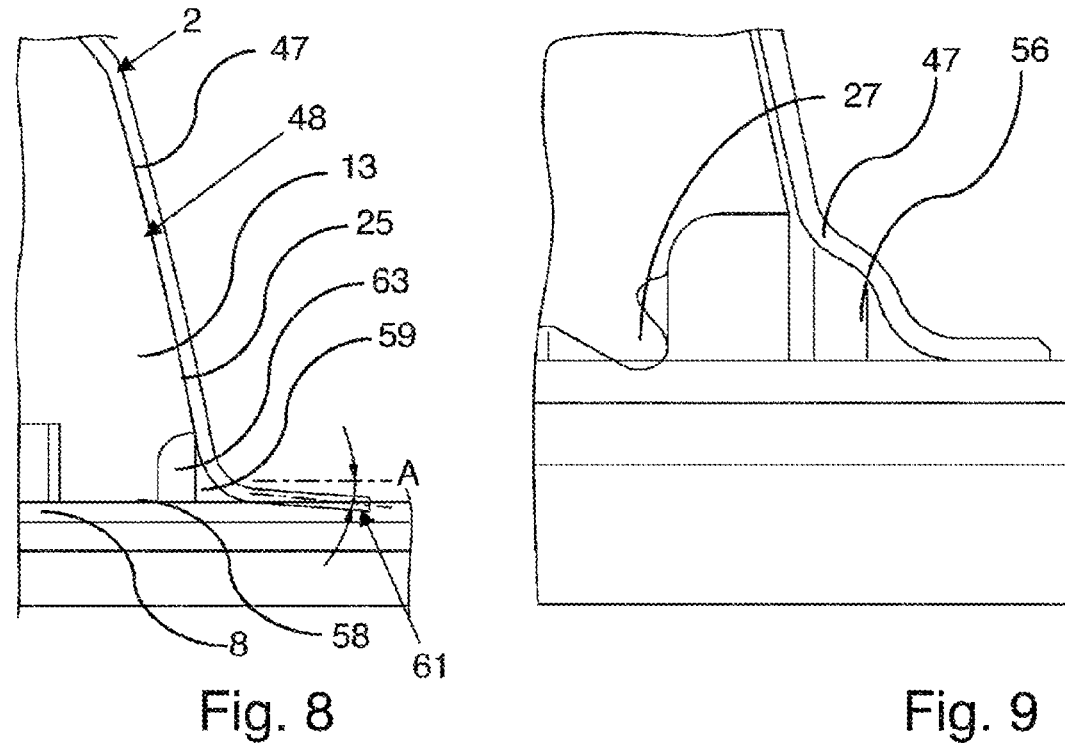
Fig. 8                                  Fig. 9

AUTOMATION FIELD DEVICE

CROSS-REFERENCE TO RELATED APPLICATIONS

The present application is related to and claims the priority benefit of German Patent Application No. 10 2021 118 128.3, filed Jul. 14, 2021, and International Patent Application No. PCT/EP2022/068397, filed Jul. 4, 2022, the entire contents of which are incorporated herein by reference.

TECHNICAL FIELD

The invention relates to an automation field device, in particular a magnetic-inductive flow meter.

BACKGROUND

In automation, particularly in process automation, field devices serving to capture and/or modify process variables are frequently used. For detecting process variables, sensors that are integrated, for example, into fill-level measuring devices, flow meters, pressure and temperature measuring devices, pH-redox potential meters, conductivity meters, etc., are used to detect the respective process variables, such as fill-level, flow, pressure, temperature, pH level, or conductivity. Actuators, such as, for example, valves or pumps, are used to influence process variables. The flow rate of a fluid in a pipeline section or a fill-level in a container can thus be altered by means of actuators. In principle, all devices which are process-oriented and which supply or process process-relevant information are referred to as field devices. In connection with the invention, "field devices" therefore also refer to remote I/Os, radio adapters, or, in general, electronic measuring components that are disposed at the field level.

A field device is in particular selected from a group consisting of flow meters, fill level measuring devices, pressure measuring devices, temperature measuring devices, limit level measuring devices and/or analytical measuring devices.

Flow meters are, in particular, Coriolis, ultrasound, vortex, thermal and/or magnetic-inductive flow meters.

Fill-level measuring devices are, in particular, microwave fill-level measuring devices, ultrasonic fill-level measuring devices, time-domain reflectometry measuring devices, radiometric fill-level measuring devices, capacitive fill-level measuring devices, inductive fill-level measuring devices and/or temperature-sensitive fill-level measuring devices.

Pressure-measuring devices are, in particular, absolute, relative, or differential-pressure devices.

Temperature measuring devices are, in particular, measuring devices with thermocouples and/or temperature-dependent resistors.

Limit level-measuring devices are, in particular, vibronic limit level measuring devices, ultrasonic limit level measuring devices and/or capacitive limit level measuring devices.

Analytical measuring devices are, in particular, pH sensors, conductivity sensors, oxygen and active oxygen sensors, (spectro-)photometric sensors, and/or ion-selective electrodes.

Known and widely used assembly concepts for electronic components use a large number of "C parts," such as screws, nuts, retaining clips, etc., in order to ensure adequate fastening of the electronic components in the housing. However, such assembly concepts are complicated and expensive.

Furthermore, wider dimensional and shape tolerances of the individual components are accepted in order to reduce production costs. As a result, undesired mechanical stresses are created in individual components during the assembly of the individual components, which lead to malfunctions or defects, or it is not possible to ensure leak-tightness between the respective components.

Sealed connections are used as standard in automation field devices in order to prevent moisture or impurities from entering the housing interior. These are designed according to operational requirements and must generally be compressed by at least 10% of the initial size. However, the pretensioning forces to be applied for this purpose are too high, especially for cold-formed components, such as deep-drawn housing molding halves. These do not withstand such pretensioning forces, and undesired deformations occur, whereby leak-tightness cannot be ensured locally.

SUMMARY

The object of the invention is to remedy the aforementioned problems.

The object is achieved by the automation field device according to the present disclosure.

The automation field device according to the invention comprises:

a measuring tube for carrying a free-flowing medium or a container for storing the medium, a measuring arrangement for determining a physical and/or chemical measured variable of the medium, wherein the measuring arrangement is at least partially arranged on the measuring tube or on the container, a housing for accommodating at least one electronic component for operating the measuring arrangement, controlling a controlled variable of the measuring arrangement, determining a measured value of the measured variable and/or evaluating the measured variable of the measuring arrangement, wherein the housing is arranged on the measuring tube or on the container, at least one molding, which is arranged in the housing, wherein the at least one molding has an at least partially elastically formed first section, wherein the first section has a receptacle with an undercut, wherein the at least one electronic component is arranged with interlocking or frictional engagement in the undercut and is held by the first section.

Advantageous embodiments are the further subject-matter of the present disclosure.

In one embodiment, the housing has an inner housing lateral surface, wherein the at least one molding has an elastically formed second section that is in mechanical contact with the inner housing lateral surface, wherein the second section has a protrusion that is in particular designed as a circumferential sealing lip.

This embodiment has the advantage that dimensional and shape tolerances in the molding and housing can be compensated for without accepting undesired mechanical stresses in the molding and/or in the housing and at the same time ensuring leak-tightness between the two components.

In one embodiment the measuring tube or the container has an outer lateral surface, wherein the at least one molding has an at least partially elastically formed third section that is in mechanical contact with the outer lateral surface of the measuring tube or container, wherein the third section has a protrusion.

This embodiment has the advantage that dimensional and shape tolerances in the molding and measuring tube or container can be compensated for without accepting undesired mechanical stresses in the molding and/or in the measuring tube or container and at the same time ensuring leak-tightness between the two components.

In one embodiment, the at least one molding has a thermoplastic and/or an elastomer at least in the first section, in the second section and/or in the third section.

In one embodiment, the thermoplastic comprises an expanded polypropylene.

The molding is a cured component that is inserted into the housing during assembly. Such an embodiment has the advantage that a large volume of low density can be achieved. The arrangement of an already cured molding has the advantage that there is no subsequent expansion, as is the case with, for example, castings applied in liquid form, which are also used to fasten electronic components in housings. Furthermore, the thermal decoupling of the electronic components from the measuring tube or the container is advantageous and achieved with a molding made of expanded polypropylene.

In one embodiment, the expanded polypropylene has a density $\rho$ with $30 \leq \rho \leq 90$ g/l and preferably $45 \leq \rho \leq 80$ g/l.

This has the advantage that an electrostatic charging of the molding during assembly on the housing and/or on the measuring tube or container is minimized.

In one embodiment, the at least one molding, at least in the first section, in the second section and/or in the third section, has a compression set DVR according to ISO 1798 of $0 \leq DVR \leq 20\%$, in particular $5 \leq DVR \leq 15\%$ and preferably $DVR < 15\%$.

In order to ensure adequate fastening of the electronic components, it has been found advantageous to design the molding in such a way that in the first section it has a compression set DVR according to the invention according to ISO 1798. This allows the receptacle for the electronic component to be widened during assembly of the electronic component so that it can be arranged at least in sections behind the undercut. The compression set DVR is a measure of how elastomers behave at a predetermined compression and subsequent relaxation. To determine the compression set DVR, reference is made to the corresponding ISO 1798 standard.

Furthermore, it has been found to be advantageous to design the molding in the second section and/or third section in such a way that, at least in this region, said molding has a compression set DVR according to the invention according to ISO 1798.

In one embodiment, the at least one molding has an elongation at break according to ISO 1798 of 10 to 20% and preferably of 14 to 16% at least in the first section, in the second section and/or in the third section.

The elongation at break is a measure of the mechanical load-bearing capacity of plastics. In order to ensure adequate fastening of the electronic components, it has been found to be advantageous to design the molding in such a way that, in the first section, it has an elongation at break according to the invention according to ISO 1798. This allows the receptacle for the electronic component to be widened during assembly of the electronic component so that it can be arranged at least in sections behind the undercut without the latter being damaged. To determine the elongation at break, reference is made to the corresponding ISO 1798 standard.

Furthermore, it has been found to be advantageous to design the molding in the second section and/or third section in such a way that, at least in this region, it has an elongation at break according to the invention according to ISO 1798.

In one embodiment, the at least one molding has a tensile strength according to ISO 1798 of 400 to 1300 kPa, in particular 600 to 1000 kPa, and preferably of 700 to 880 kPa, at least in the first section, in the second section and/or in the third section.

In one embodiment, the at least one molding has, at least in the first section, in the second section and/or in the third section, a compressive stress according to ISO 844 of 100 to 700 kPa, in particular 220 to 500 kPa, and preferably 350 to 380 kPa, at a 25% deformation.

In one embodiment, the at least one electronic component comprises a circuit board that has electronic components for operating the measuring arrangement, controlling the control variable of the measuring arrangement, and/or evaluating the measured variable of the measuring arrangement.

In one embodiment, the circuit board has a rigid first circuit board section and a rigid second circuit board section, wherein the circuit board has a flexible third circuit board section, wherein the first circuit board section is separated from the second circuit board section by the third circuit board section.

In one embodiment, the housing has an opening, wherein a display glass, that is transparent at least in sections, is inserted into the opening, wherein the circuit board has a display arranged in particular on the first circuit board section, wherein the display can be viewed through the display glass.

In one embodiment, the housing has an in particular resiliently formed centering device for centering the molding on the inner housing lateral surface, which centering device is configured to limit a rotation of the at least one molding in the housing about a longitudinal axis of the measuring tube or of the container and/or to implement a centering of the display with the display glass, wherein the centering device engages in an undercut of the molding.

Such an embodiment has the advantage that the at least one molding is held in a target position during its assembly in the housing, so that no rotation of the molding prevents the assembly on the measuring tube or on the container. A groove or an undercut can be provided in the molded part for adequate fastening, into which groove the centering device engages.

BRIEF DESCRIPTION OF THE DRAWINGS

The invention is explained in greater detail with reference to the following figures. In the figures:

FIG. 7A shows a perspective view of a partially sectioned housing with a first molding half;

FIG. 7B shows a detail of a cross-section through the housing with an arranged and fastened first molding half;

FIG. 8 shows a detail of an edge region of a first housing molded part half in contact with a measuring tube;

FIG. 9 shows a detail of an edge region of a first housing molded part half in contact with a measuring tube;

DETAILED DESCRIPTION

Figure 1:
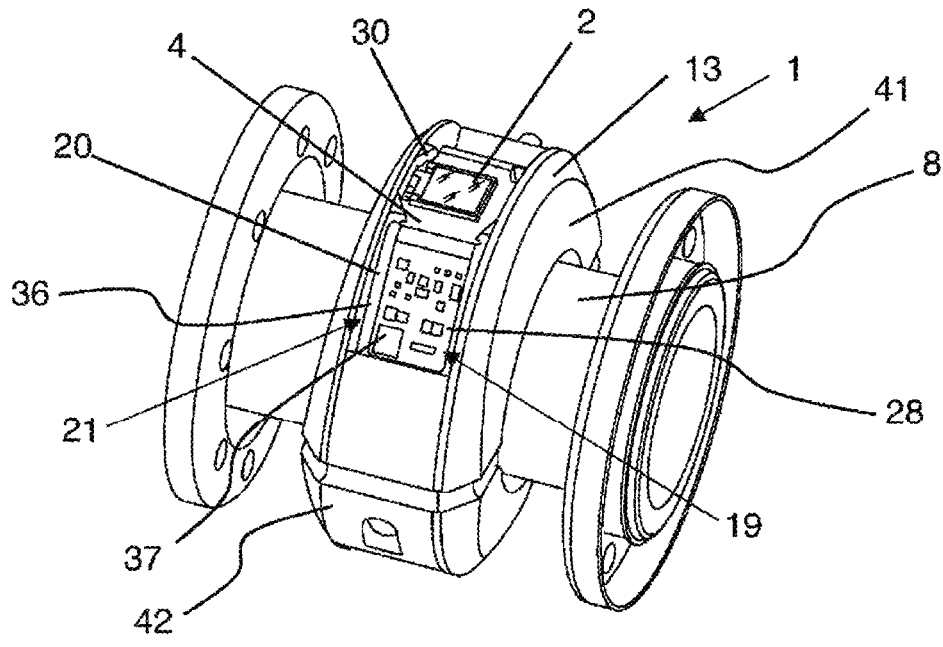
FIG. 1 shows a perspective view of an automation field device according to the present disclosure.

FIG. 1 shows a perspective view of an automation field device 1 according to the invention. The automation field device 1 comprises a measuring tube 8 for carrying a free-flowing medium and a measuring arrangement 3 covered by the molding 13 for determining a physical and/or chemical measured variable of the medium, which measuring arrangement 3 is arranged on the measuring tube 8. The measuring arrangement 3 can be, for example, a thermal sensor comprising two temperature probes or two in particular medium-contacting measuring electrodes for sensing a measurement voltage induced in a free-flowing medium in conjunction with a magnetic-field generating apparatus. A plurality of further measuring arrangements are known, all of which are suitable for the automation field device 1 according to the invention. Examples thereof are the measuring arrangements of the measuring devices mentioned in the introduction. Furthermore, the automation field device 1 comprises a housing arranged on the measuring tube 8 for accommodating at least one electronic component 4 for operating the measuring arrangement 3, controlling a control variable of the measuring arrangement 3, determining a measured value of the measured variable and/or evaluating the measured variable of the measuring arrangement 3. The housing is not shown in FIG. 1 in order to make visible the two-part molding 13 arranged on the measuring tube 8, which molding 13 is arranged in the housing when fully assembled and is completely or at least partially covered by the housing or by its housing wall. The molding 13 serves to fasten or hold the electronic component 4 and has a thermoplastic and/or an elastomer at least in a first section 21. The first section 21 is located on an outer molding lateral surface. In a more advantageous embodiment, the thermoplastic comprises an expanded polypropylene, wherein the expanded polypropylene has a density ρ with 30≤ρ≤90 g/l and preferably 45≤ρ≤80 g/l. Expanded polypropylene with the density according to the invention has a reduced electrostatic charging of the molding 13 during the assembly of the molding 13 in the housing or on the measuring tube. The molding 13 is formed from a monolithic first molding half 41 and a second molding half 42, which in this case is identical and also monolithic. The first molding half 41 is thereby connected to the second molding half 42 at least by interlocking engagement. Together, the first molding half 41 and the second molding half 42 enclose the measuring tube 8 at least in a measuring tube cross-section.

The first section 21 is elastically formed and has a receptacle 19 for accommodating an electronic component 4. The receptacle 19 has at least one undercut 20. The receptacle 19 can be formed as a through-opening or as a depression or blind hole. The undercut 20 can assume the shape of a latching lug 30 or a plurality of latching lugs and/or be formed as a guide rail 36 in which the electronic component 4 can be or is inserted. The guide rail 36 is formed as an elongated slot in the molding 13 or as a flange projecting from a base body of the molding 13. An electronic component 4 is arranged in the receptacle 19 with interlocking and/or force-fitting engagement so that it can be held and cannot fall out when the molding 13 is assembled on the measuring tube 8 and/or on the housing. Further C parts for fastening can be provided, but are not necessary. The electronic component 4 is held by the first section 21 or the undercut 20 in the form of four latching lugs 30 and a guide rail 36 integrated into the molding. Furthermore, the molding 13 has, at least in the first section 21, a compression set DVR according to ISO 1798 of 0≤DVR≤20%, in particular 5≤DVR≤15% and preferably DVR<15%. Because the molding 13 is deformed at least in sections during assembly in the first section 21 in order to arrange and fasten the electronic component 4 in the receptacle 19, it is essential that the compression set DVR of the molding 13 not be greater than 20%. In order to keep mechanical stresses on the electronic component 4 as low as possible, it is also advantageous if the DVR is greater than/equal to 5%. In addition, the molding 13 has an elongation at break according to ISO 1798 of 10 to 20% and preferably of 14 to 16% at least in the first section 21. Alternatively, the necessary mechanical properties of the molding 13 can also be described by the tensile strength. The molding 13 has, at least in the first section 21, a tensile strength according to ISO 1798 of 400 to 1300 kPa, in particular 600 to 1000 kPa, and preferably of 700 to 880 kPa.

The electronic component 4 comprises a circuit board 28, on which electronic components 37 for operating the measuring arrangement, controlling the control variable of the measuring arrangement, and/or evaluating the measured variable of the measuring arrangement are arranged. The electronic components 37 include, for example, processors, electromechanical components such as switches or relays, and passive components such as resistors, capacitors and/or inductive components and/or active components such as diodes, transistors and/or integrated circuits. In addition, a display 2 is arranged on a first circuit board section for displaying measured values of the measured variable, process characteristics, and/or field-device-specific system information. The electronic component 4 can further comprise connection cables with which the coils are connected to the operating circuit. These connection cables can run in grooves provided specifically for this purpose and can be fastened there.

Figure 2:
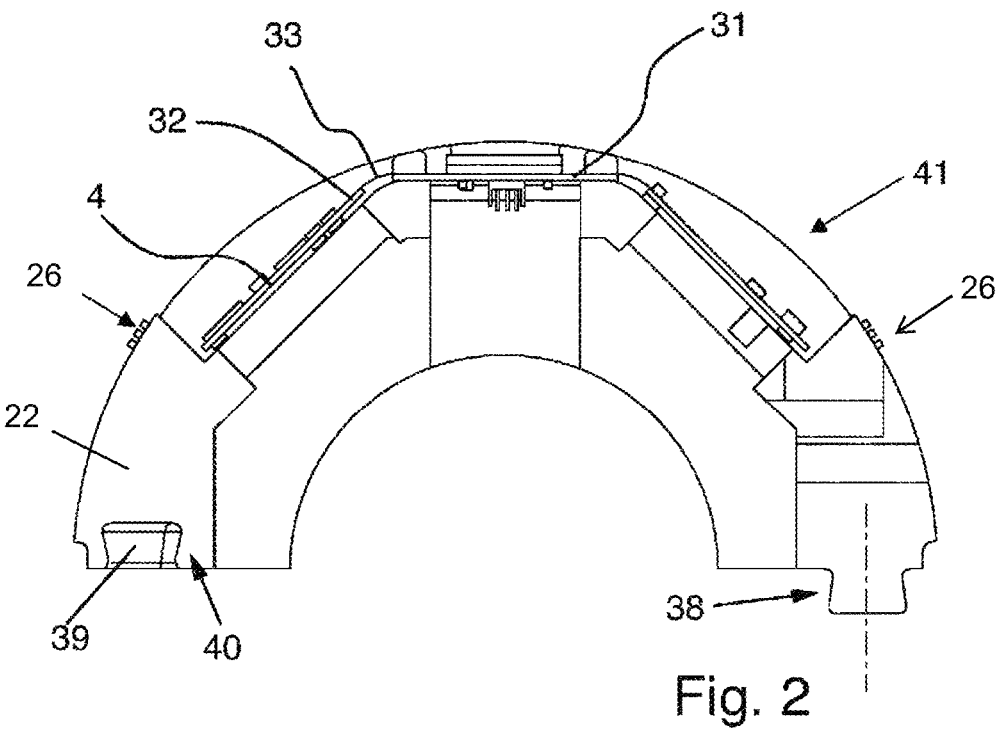
FIG. 2 shows a cross-section through a first molding half with an electronic component arranged thereon.

FIG. 2 shows a cross-section through the first molding half 41 of the molding of FIG. 1 with an electronic component 4 arranged thereon. The electronic component 4 shown comprises a circuit board that has electronic components for operating the measuring arrangement, controlling the control variable of the measuring arrangement, and/or evaluating the measured variable of the measuring arrangement. The circuit board has a rigid first circuit board section 31 and a rigid second circuit board section 32, which are separated from one another. In addition, the circuit board has a flexible third circuit board section 33, via which the separation of the first circuit board section 31 from the second circuit board section 32 is realized. The housing (not shown in FIG. 2) has an inner housing lateral surface that, after assembly, is in mechanical contact with the first molding half 41 shown at least in places or via at least one elastically formed second section 22. The second section 22 has at least one protrusion 26 that, in the case of the embodiment shown, is realized as a plurality of protruding ribs. The at least one protrusion 26 is designed such that it is compressed or displaced when the first molding half 41 is assembled into a first housing molded part half. This has the purpose of compensating for manufacturing tolerances of the first molding half 41, of the first housing molded part half 51 and/or of the measuring tube. Like the first section 21, the second section 22 also comprises a thermoplastic in the form of an expanded polypropylene. The first molding half 41 has, in the second section 22, a compression set DVR according to ISO 1798 0≤DVR≤20%, in particular 5≤DVR≤15% and preferably DVR<15%. Furthermore, the first molding half 41 has an elongation at break according to ISO 1798 of 10 to 20% and preferably of 14 to 16% in the second section 22. A further characteristic mechanical variable of the first molding half 41 is the tensile strength. In the second section 22, said tensile strength is 400 to 1300 kPa, in particular 600 to 1000 kPa, and preferably from 700 to 880 kPa according to ISO 1798.

Furthermore, the first molding half 41 has a projection 38 with a projection longitudinal axis that lies within the cross-section of the first molding half 41. A cross-sectional area of the projection 38 increases at least in sections along the projection longitudinal axis, in particular in the direction of a receptacle that is located in a second molding half (not shown) and is complementary to the projection 38. The projection 38 can be inserted into the receptacle, whereby an interlocking closure can be formed. According to the embodiment shown, the first molding half 41 also has a receptacle 39 designed to be complementary to a projection of the second molding half in the form of an opening. The receptacle 39 is arranged in a fourth section 40 of the first molding half 41, which fourth section is elastically formed. This allows the fourth section 40 to deform in order to receive the projection of the second molding half during assembly and to connect the two molding halves 41, 42 to one another with interlocking engagement to thus realize adequate fastening thereof on the measuring tube.

Figure 3:
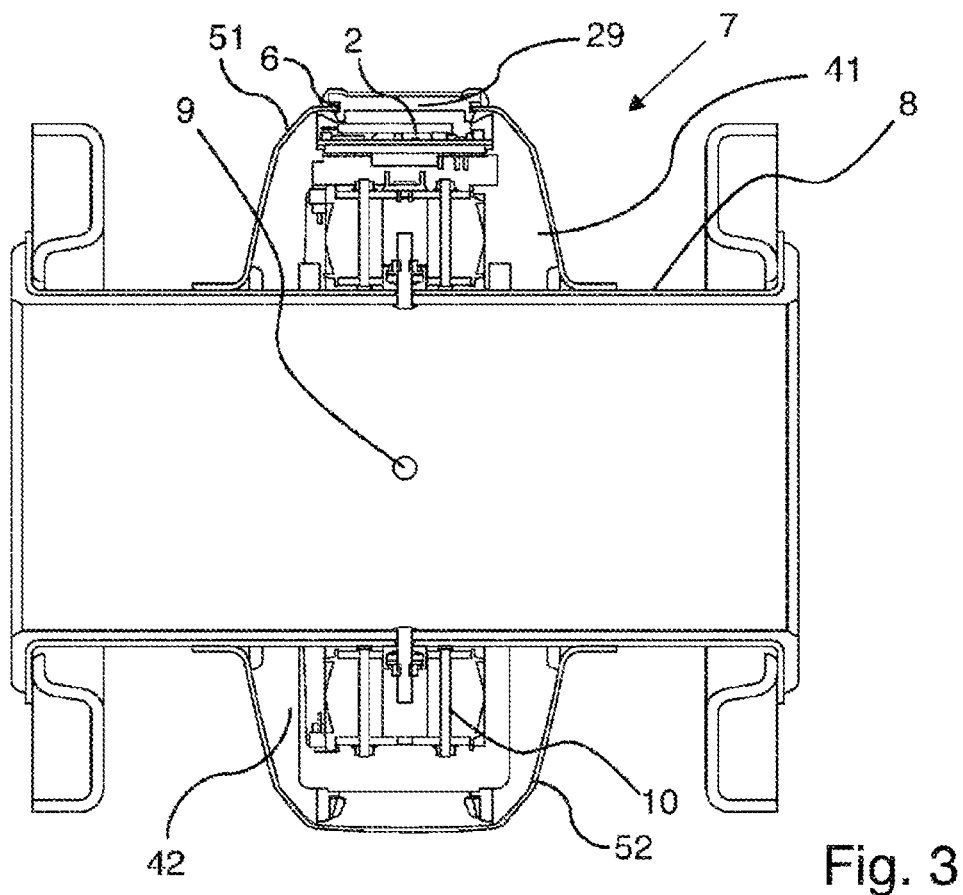
FIG. 3 shows a longitudinal section through a magnetic-inductive flow meter according to the present disclosure.

FIG. 3 shows a longitudinal section through a magnetic-inductive flow meter 7 as an example of an automation field device according to the invention. The magnetic-inductive flow meter 7 comprises a measuring tube 8 for conducting a free-flowing medium and two terminal process connections. The measuring tube 8 is a longitudinally welded steel tube with an electrically insulating liner applied to an inner lateral surface. The measuring arrangement of the magnetic-inductive flow meter comprises an apparatus 9 for measuring an induced measurement voltage in the free-flowing medium, in particular at least two diametrically arranged measuring electrodes that are inserted and fastened in a medium-tight manner in a provided opening in the tube wall of the measuring tube 8 in a medium-contacting manner. Furthermore, the measuring arrangement comprises a device 10 for generating a magnetic field that penetrates the measuring tube 8, consisting of at least two diametrically arranged coils that are configured to generate a magnetic field with a main magnetic field axis that runs substantially perpendicular to a measuring electrode axis connecting the two measuring electrodes and a longitudinal axis of the measuring tube 8. A fill-level monitoring electrode and a reference electrode are also arranged on the measuring tube 8.

The electronic component 4 with the measurement circuit, operating circuit and/or control circuit arranged on the circuit board is accommodated in a cold-formed housing 5. The housing 5 comprises a, in particular, cold-formed first housing molded part half 51 that is connected to a, in particular, cold-formed second housing molded part half 52, said housing molded part halves being arranged diametrically relative to one another. The housing 5 has an opening 6 in which a display glass 29 that is transparent at least in sections is arranged. A circuit board has a display 2 arranged on the first circuit board section, which display can be viewed through the display glass 29. An outer lateral surface of the measuring tube 8 and the first molding half 41, as well as the second molding half 42, each delimit a cavity in which the coils of the device 10 for generating the magnetic field are arranged.

Figure 4:
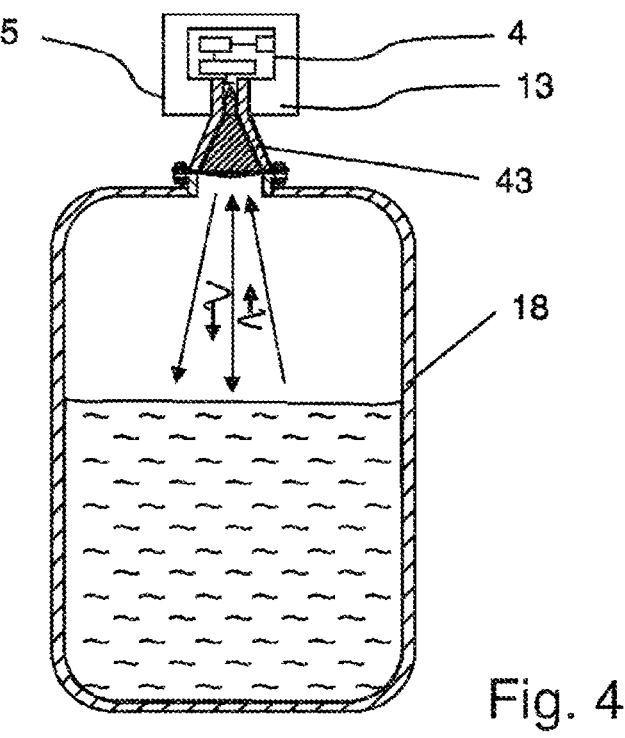
FIG. 4 shows a longitudinal section through a radar-based fill-level measuring device according to the present disclosure.

FIG. 4 shows a schematic representation of a longitudinal section through a radar-based fill-level measuring device 43 as a further example of an automation field device. For measuring the fill-level of filling materials in containers 18, radar-based measuring methods have become established, since they are robust and low-maintenance. A key advantage of radar-based measuring methods lies in the ability to measure the fill-level more or less continuously. In the context of this patent application, the term "radar" refers to radar signals having frequencies between 0.03 GHz and 300 GHz. Typical frequency bands at which fill-level measurement is performed are at 2 GHZ, 26 GHZ, 79 GHz, or 120 GHz. The two common measuring principles here are the pulse time-of-flight principle (also known under the term "pulse radar") and the FMCW ("frequency-modulated continuous wave") principle. A fill-level measuring device which operates according to the pulse time-of-flight method is described, for example, in published patent application DE 10 2012 104 858 A1. For a typical construction of FMCW-based fill-level measuring devices, reference is made by way of example to published patent application DE 10 2013 108 490 A1. In addition, the measuring principles of FMCW and pulse radar are described in more detail in "Radar Level Detection, Peter Devine, 2000," for example. The radar-based fill-level measuring device 43 also has a housing 5 with a molding 13 arranged therein. The molding 13 has a first section with a receptacle in which an electronic component 4 is arranged. The properties of the first section are identical to those of the automation field device shown and described in FIG. 1 and FIG. 2.

Figure 5:
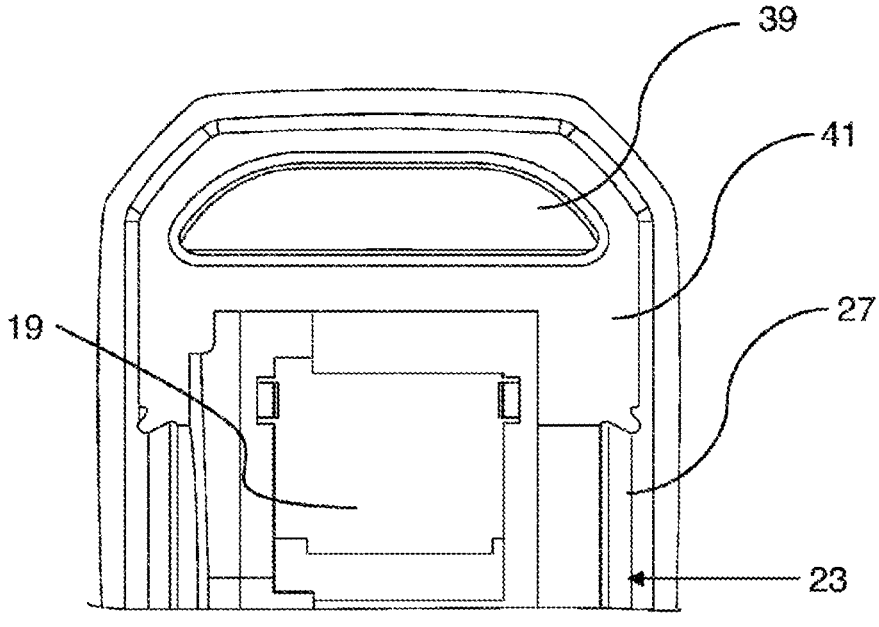
FIG. 5 shows a view from below of a first molding half.

FIG. 5 is a view from below of the first molding half 41 from FIG. 2. The receptacle 19 for receiving the electronic component can be seen. The receptacle 19 is designed as a through-opening. Furthermore, the receptacle 39 for receiving a projection for forming a frictional and/or interlocking connection can be seen. Furthermore, a third section 23 that is elastically formed can be seen. The third section 23 has a protrusion 27 that is to be arranged in mechanical contact with an outer lateral surface of a measuring tube or a container and is formed at least as a sealing lip extending partially around the circumference of the measuring tube or the container. The protrusion 27 is designed such that the protrusion 27 is displaced or compressed when the first molding half 41 is arranged on the measuring tube or on the container. Manufacturing tolerances can thus be compensated for and mechanical stress and/or leaks can be reduced. The third section 23 is also a thermoplastic and/or an elastomer, or in a preferred embodiment an expanded polypropylene that has a compression set DVR according to ISO 1798 of 0≤DVR≤20%, in particular 5≤DVR≤15% and preferably DVR<15%. Furthermore, the third section 23, in particular the protrusion 27, is designed such that there is an elongation at break according to ISO 1798 of 10 to 20% and preferably of 14 to 16% and/or a tensile strength according to ISO 1798 of 400 to 1300 kPa, in particular 600 to 1000 kPa, and preferably of 700 to 880 kPa.

Figure 6:
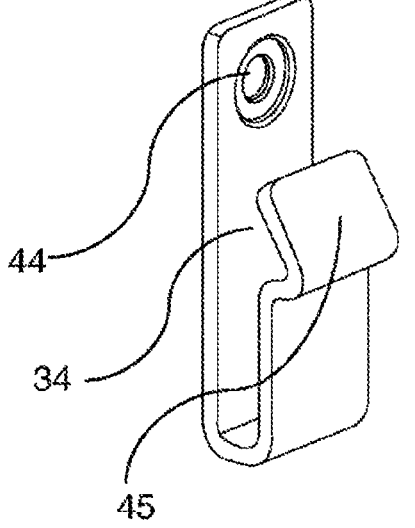
FIG. 6 shows a perspective view of a centering device.

FIG. 6 is a perspective view of a centering device 34 for blocking a tangential displacement of the molding half in the housing molded part half and/or on the outer lateral surface of the measuring tube. The centering device 34 has a beading 44 via which it can be integrally connected to the inner housing lateral surface of the housing molded part half. Furthermore, the centering device 34 has a hook 45 at one end, which hook is provided for latching into and engaging with a receptacle in the molding half and is thus suitable for forming an interlocking and/or frictional connection between the molding half and the housing molded part half. The centering device 34 is formed as a thin bent sheet metal part that is designed to be resilient at least in such a way that, when the molding half is inserted into the housing molded part half in an assembly direction, the hook 45 can be displaced at least in sections away from the inner housing lateral surface of the housing molded part half.

FIG. 7A is a perspective view of a partially sectioned housing molded part half 51 with a first molding half 41 to be inserted in a linear assembly direction (see arrow). The centering device 34 is integrally attached to the inner housing lateral surface 24 of the first housing molded part half 51 by means of joining methods, in particular welding. The first housing molded part half has at least one bending lug 53 in the second edge section 62 for forming an interlocking connection with the second housing molded part half 52 (not shown). In order to form the connection, the at least one bending lug 53 is bent in such a way that it interacts with the second edge section of the contacting second housing molded part half in such a way that the two housing halves can no longer be separated from one another without one of the two housing halves having to be plastically deformed. Furthermore, the second edge section 62 of the first housing molded part half 51 comprises an at least partially circumferential rabbet 54 for limiting a displacement of the second housing molded part half in a longitudinal direction and/or a transverse direction of the measuring tube when the two housing halves are assembled, i.e., when the two housing halves are put together, but the bending lugs are not yet bent. The rabbet 54 also engages in a recess in the second edge section of the second housing molded part half. The recess can be formed as an opening in the second edge section of the second housing molded part half or can be formed by a second edge section of the second housing molded part half that is shortened compared to the second edge section of the first housing molded part half. As a result, the two housing mold halves can be centered more precisely relative to one another during assembly. The at least one bending lug 53 is, at least in sections, monolithically connected to the rabbet 54.

FIG. 7B shows a detail of a cross-section through the first housing molded part half 51 in FIG. 7A with a first molding half 41 arranged and fastened in the final assembled position. The first molding half 41 has a receptacle 46 in conjunction with an undercut in which the hook 45 of the centering apparatus engages.

FIG. 8 shows a detail of a first embodiment of an edge region of a first housing molded part half in contact with an outer lateral surface of a measuring tube. The housing 2 shown has a housing wall that, together with the outer lateral surface 25 of the measuring tube 8, delimits a housing interior 48. The housing wall 47 has a first edge section 61 that, at least in sections, is in direct contact with the outer lateral surface 25 of the measuring tube 8 and is bent at least in sections away from the housing interior 48. According to the invention, at least the first edge section 61 is braced with the measuring tube 8. This means that the housing is assembled on and fastened to the measuring tube in such a way that the first edge section 61 is deformed and a mechanical stress remains in the housing at least in sections.

The first edge section 61 is free of a bend at least in a longitudinal section. A beading in the housing wall thus does not belong to the first edge section 61 according to the invention. Furthermore, in the longitudinal section through the field device, the first edge section 61 has a first edge section longitudinal axis A (dashed) that intersects the outer lateral surface 25 of the measuring tube 8 at an angle $\alpha$, wherein $\alpha$ has an angular dimension between 1° and 10° or 5°. A dashed line that represents a longitudinal axis of the measuring tube is shown as a reference to the edge section longitudinal axis A.

The molding 13 is arranged in the housing interior 48 and has an outer molding lateral surface 25. In the embodiment in FIG. 8, the outer molding lateral surface 25, the housing wall 47 and the outer lateral surface 58 delimit a seal seat 59 for a sealing means (not shown) applied in particular in liquid form. The molding 13 also has a depression 63 for forming the seal seat 59, which depression is designed to be wedge-shaped at least in sections. The sealing means comprises at least in part a polyurethane, a polysiloxane, a polyethylene, and/or an epoxy resin. The molding 13 is at least partially formed from a particle foam, comprising at least one polystyrene, a polyphenylene sulfide, an expanded polypropylene, and a polyurethane.

FIG. 9 shows a detail of a second embodiment of an edge region of a first housing molded part half in contact with an outer lateral surface of a measuring tube. The difference from the embodiment in FIG. 8 is that the housing wall 47 has a beading 56 on an inner housing lateral surface for stiffening the housing wall 47, which beading 56 additionally serves as a seal seat for stiffening, so that a sealing means (not shown) is arranged at least in portions in the beading 56. Furthermore, FIG. 9 shows a protrusion 27 that is in mechanical contact with an outer lateral surface of the measuring tube and that is formed at least as a sealing lip extending partially around the circumference of the measuring tube or the container.

Figure 10:
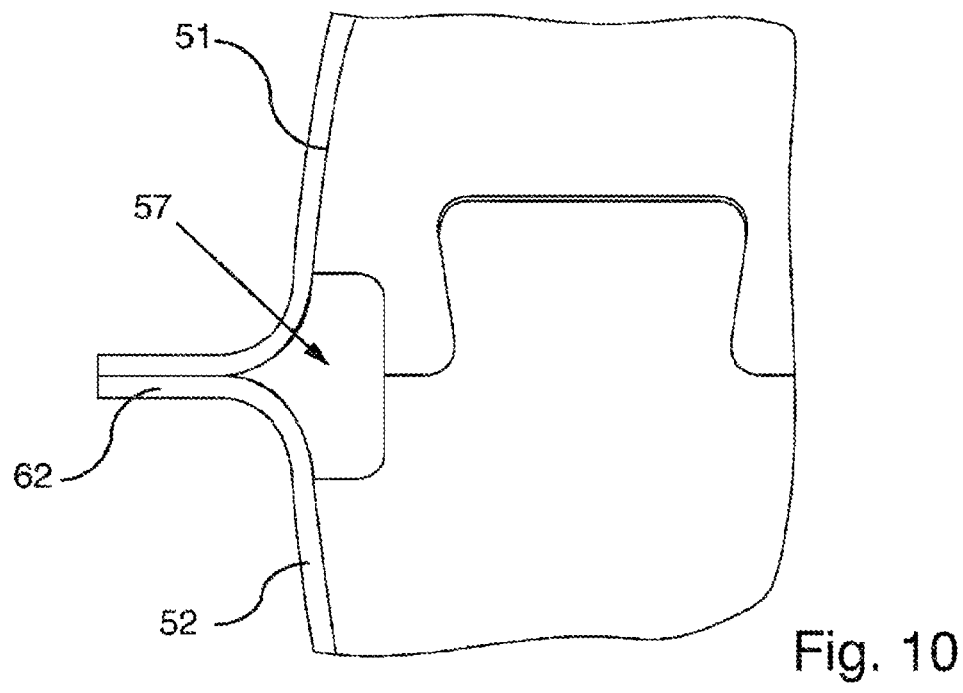
FIG. 10 shows a detail of an edge region of a first housing molded part half in contact with a second housing molded part half.

FIG. 10 shows a detail of an edge region of a first housing molded part half 51 in contact with a second housing molded part half 52. The first housing molded part half 51 and the second housing molded part half 52 each have a second edge section 62 via which they are in direct contact with one another at least in sections. The first housing molded part half 51 and the second housing molded part half 52 are connected to one another with interlocking and/or frictional engagement via bending lugs (not shown) and additionally integrally connected via the sealing means 57 applied in liquid form. The sealing means 57 is arranged in a seal seat 59 formed by the second edge portions 62 in mutual contact, which seal seat is delimited by the two housing halves at least in the radial direction of the measuring tube 8. The seal seat 59 is designed to be wedge-shaped at least in sections.

Figure 11:
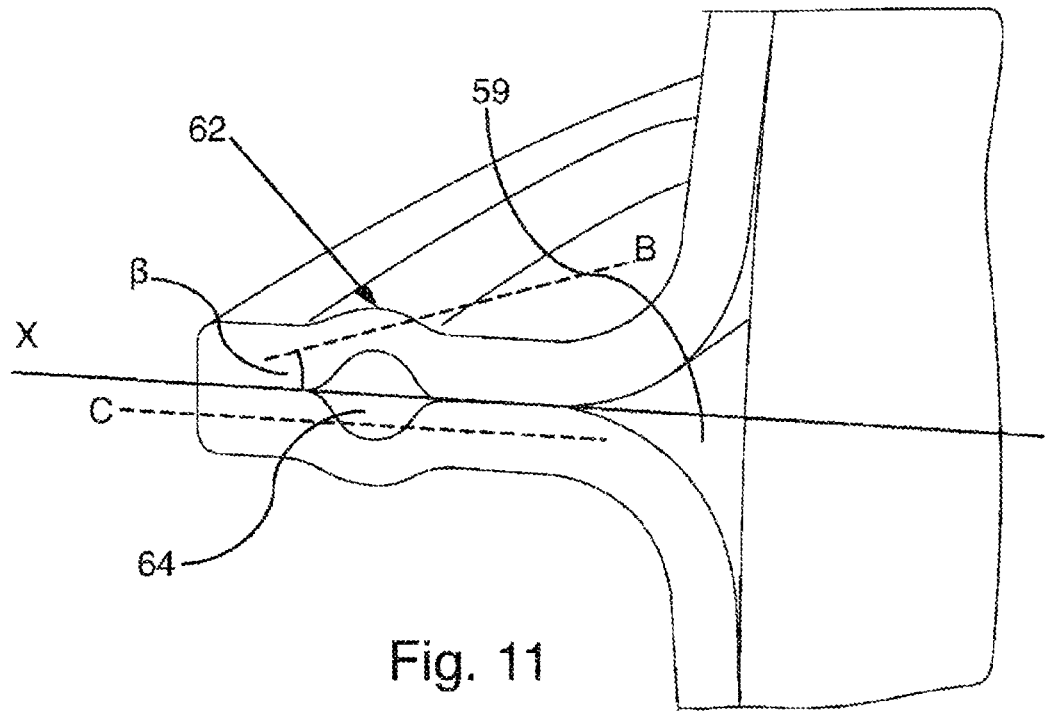
FIG. 11 shows a perspective view of a sectional representation of a seal seat between the first housing molded part half and the second housing molded part half.

FIG. 11 shows a perspective view of a sectional representation of a seal seat between the first housing molded part half and the second housing molded part half. FIG. 11 differs from FIG. 10 substantially in that, in addition to the seal seat 59, the two second edge sections 62 together delimit a collecting volume 64 for receiving sealing means (not shown) displaced in the expansion direction. This is achieved by bending a subsection of the second edge section 62, whereby the second edge sections 62, which are in mutual contact after assembly, additionally limit the collecting volume 64 in the direction of the measuring tube. Alternatively, the volume provided as a collecting volume 64 can assume the function of the seal seat, i.e., the sealing means is applied in liquid form in one of the bent subsections and, when the two housing halves are being clamped and fastened, the excess sealing means is displaced in the direction of the volume marked as the seal seat 59 in this embodiment, and the seal seat 59 thus assumes the function of the collecting volume.

The second edge sections 62 shown have, at least in a cross-section through the field device, in each case a second edge section longitudinal axis C (dotted), which runs parallel to an axis X (solid), which lies in a central plane. The central plane is spanned by a longitudinal axis of the measuring tube and a transverse axis running perpendicular thereto. It extends through at least one contact point of the first housing molded part half and the second housing molded part half, in particular through the contact points of the second edge sections 62.

According to an advantageous embodiment, the second edge sections 62 are designed such that they have a second edge section longitudinal axis B (dashed) that intersects the central plane at an angle β, wherein β has an angular dimension of 1° to 10°, in particular 5°. The alternative second edge section longitudinal axis B is also shown in FIG. 11. Alternatively, the second edge section longitudinal axis B can merge into the second edge section longitudinal axis C after the two housing halves have been clamped and connected.

The invention claimed is:

1. An automation field device, comprising:
a measuring tube configured to conduct a free-flowing medium or a container operable to store a medium;
a measuring arrangement configured to determine a physical and/or chemical measured variable of the medium, wherein the measuring arrangement is at least partially disposed on the measuring tube or on the container;
a housing configured to accommodate at least one electronic component operable for operating the measuring arrangement, controlling a controlled variable of the measuring arrangement, determining a measured value of the measured variable, and/or evaluating the measured variable of the measuring arrangement, wherein the housing is disposed on the measuring tube or on the container; and
at least one molding, which is disposed in the housing, wherein the at least one molding includes an at least partially elastically formed first section and an elastically formed second section, wherein the first section includes a receptacle with an undercut,
wherein the at least one electronic component is arranged with interlocking or frictional engagement in the undercut and is held by the first section,
wherein the measuring tube or the container includes an outer lateral surface,
wherein the at least one molding includes an at least partially elastically formed third section which is in mechanical contact with the outer lateral surface, and
wherein the third section includes a first protrusion.
2. The field device according to claim 1, wherein:
the housing includes an inner lateral surface;
the second section is in mechanical contact with the inner lateral surface; and
the second section includes a second protrusion which is configured as a circumferential sealing lip.
3. The field device according to claim 2, wherein the at least one molding comprises a thermoplastic and/or an elastomer at least in the first section, in the second section, and/or in the third section.

4. The field device according to claim 3, wherein the thermoplastic comprises an expanded polypropylene.
5. The field device according to claim 4, wherein the expanded polypropylene has a density (ρ) of 30≤ρ≤90 g/l.
6. The field device according to claim 4, wherein the expanded polypropylene has a density (ρ) of 45≤ρ≤80 g/l.
7. The field device according to claim 1, wherein the at least one molding, at least in the first section, in the second section, and/or in the third section, has a compression set (DVR) according to ISO 1798 of 0≤DVR≤20%.
8. The field device according to claim 1, wherein the at least one molding, at least in the first section, in the second section, and/or in the third section, has a compression set (DVR) according to ISO 1798 of DVR<15%.
9. The field device according to claim 1, wherein the at least one molding has an elongation at break according to ISO 1798 of 10 to 20% at least in the first section, in the second section, and/or in the third section.
10. The field device according to claim 1, wherein the at least one molding has an elongation at break according to ISO 1798 of 14 to 16% at least in the first section, in the second section, and/or in the third section.
11. The field device according to claim 1, wherein the at least one molding has a tensile strength according to ISO 1798 of 400 to 1300 kPa at least in the first section, in the second section, and/or in the third section.
12. The field device according to claim 1, wherein the at least one molding has a tensile strength according to ISO 1798 of 700 to 880 kPa at least in the first section, in the second section, and/or in the third section.
13. The field device according to claim 1, wherein the at least one molding has, at least in the first section, in the second section, and/or in the third section, a compressive stress according to ISO 844 of 100 to 700 kPa at a 25% deformation.
14. The field device according to claim 1, wherein the at least one molding has, at least in the first section, in the second section, and/or in the third section, a compressive stress according to ISO 844 of 350 to 380 kPa at a 25% deformation.
15. The field device according to claim 1, wherein the at least one electronic component comprises a circuit board, which includes electronic components configured to operate the measuring arrangement, control the control variable of the measuring arrangement, and/or evaluate the measured variable of the measuring arrangement.
16. The field device according to claim 15, wherein:
the circuit board includes a rigid first circuit board section and a rigid second circuit board section;
the circuit board includes a flexible third circuit board section; and
the first circuit board section is separated from the second circuit board section by the third circuit board section.
17. The field device according to claim 16, wherein:
the housing includes an opening;
a display glass, which is transparent at least in a portion, is disposed in the opening;
the circuit board includes a display disposed on the first circuit board section; and
the display can be viewed through the display glass.
18. The field device according to claim 17, wherein the housing includes a resiliently formed centering device operable to center the molding on an inner lateral surface of the housing, which centering device is configured to limit a rotation of the at least one molding in the housing about a longitudinal axis of the measuring tube or of the container and/or to effect a centering of the display with the display glass, wherein the centering device engages in an undercut of the molding.

19. An automation field device, comprising:

a measuring tube configured to conduct a free-flowing medium or a container operable to store a medium;

a measuring arrangement configured to determine a physical and/or chemical measured variable of the medium, wherein the measuring arrangement is at least partially disposed on the measuring tube or on the container;

a housing configured to accommodate at least one electronic component operable for operating the measuring arrangement, controlling a controlled variable of the measuring arrangement, determining a measured value of the measured variable, and/or evaluating the measured variable of the measuring arrangement, wherein the housing is disposed on the measuring tube or on the container; and at least one molding, which is disposed in the housing, wherein the at least one molding includes an at least partially elastically formed first section, wherein the first section includes a receptacle with an undercut, wherein the at least one electronic component is arranged with interlocking or frictional engagement in the undercut and is held by the first section, wherein the at least one electronic component comprises a circuit board, which includes electronic components configured to operate the measuring arrangement, control the control variable of the measuring arrangement, and/or evaluate the measured variable of the measuring arrangement, wherein:

the circuit board includes a rigid first circuit board section and a rigid second circuit board section;

the circuit board includes a flexible third circuit board section; and the first circuit board section is separated from the second circuit board section by the third circuit board section, wherein:

the housing includes an opening;

a display glass, which is transparent at least in a portion, is disposed in the opening;

the circuit board includes a display disposed on the first circuit board section; and the display can be viewed through the display glass, wherein the housing includes a resiliently formed centering device operable to center the molding on an inner lateral surface of the housing, which centering device is configured to limit a rotation of the at least one molding in the housing about a longitudinal axis of the measuring tube or of the container and/or to effect a centering of the display with the display glass, and wherein the centering device engages in an undercut of the molding.

20. An automation field device, comprising:

a measuring tube configured to conduct a free-flowing medium or a container operable to store a medium;

a measuring arrangement configured to determine a physical and/or chemical measured variable of the medium, wherein the measuring arrangement is at least partially disposed on the measuring tube or on the container;

a housing configured to accommodate at least one electronic component operable for operating the measuring arrangement, controlling a controlled variable of the measuring arrangement, determining a measured value of the measured variable, and/or evaluating the measured variable of the measuring arrangement, wherein the housing is disposed on the measuring tube or on the container; and at least one molding, which is disposed in the housing, wherein the at least one molding includes an at least partially elastically formed first section, wherein the first section includes a receptacle with an undercut, wherein the at least one electronic component is arranged with interlocking or frictional engagement in the undercut and is held by the first section, wherein the housing includes a resiliently formed centering device operable to center the molding on an inner lateral surface of the housing, which centering device is configured to limit a rotation of the at least one molding in the housing about a longitudinal axis of the measuring tube or of the container, and wherein the centering device engages in an undercut of the molding.

\* \* \* \* \*